No. 801,626. PATENTED OCT. 10, 1905.
T. W. WRIGHT.
TWO PIECE HANDLE.
APPLICATION FILED FEB. 6, 1905.
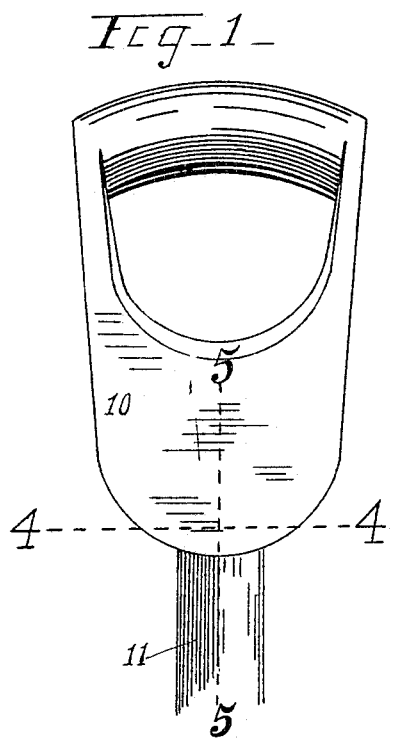
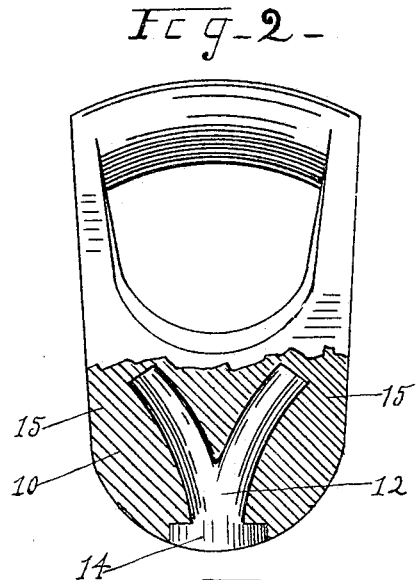
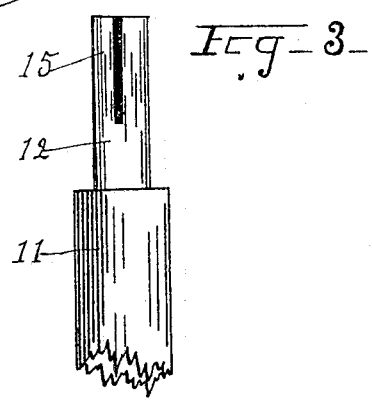
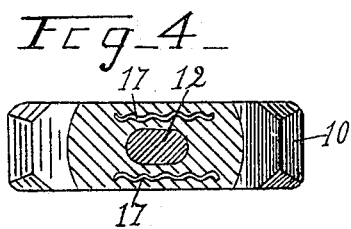
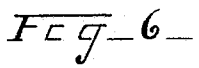
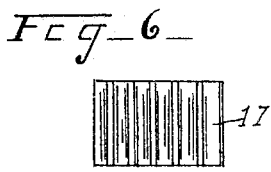
Witness
C. G. Hoen.
W. M. Gentle.
Inventor
Thomas W. Wright
By V. H. Lockwood
Attorney

UNITED STATES PATENT OFFICE.

THOMAS W. WRIGHT, OF ANDERSON, INDIANA.

TWO-PIECE HANDLE.

No. 801,626. Specification of Letters Patent. Patented Oct. 10, 1905.

Application filed February 6, 1905. Serial No. 244,462.

*To all whom it may concern:*

Be it known that I, THOMAS W. WRIGHT, of Anderson, county of Madison, and State of Indiana, have invented a certain new and useful Two-Piece Handle; and I do hereby declare that the following is a full, clear, and exact description thereof, reference being had to the accompanying drawings, in which like numerals refer to like parts.

This invention relates to an improvement on the D-handle set forth in Letters Patent No. 710,389, granted to me on September 30, 1902.

From experience I found that in a handle made in accordance with my former patent aforesaid the lower part of the D would crack or check on both sides at the point where the handle or stem enters the D. This result is due to the contraction of the timber under the influence of the weather, and for that reason I found that it was impractical to make said two-piece handles in the manner shown in said patent, although the feature mentioned and claimed in said patent, the manner of securing the parts together, was valuable and good, as the union was strong and permanent; but whenever the D checked and made a wide crack on each side of the handle and stem and showed the handle and stem people would not buy them, and they were not salable, and the whole became practically worthless. I have also learned from others who have undertaken to make two-piece handles by inserting the end of the stem in the D that the checking referred to rendered the same impossible to manufacture with any hope of the handles remaining in their finished and perfect condition, and therefore impractical and worthless as an article of manufacture.

The object of this invention is to overcome this difficulty in checking, and thereby convert the failure heretofore encountered in two-piece handles into a success, for two-piece handles can be made much cheaper than one-piece handles if they can be made so as to be permanently perfect and not check or come apart.

The nature of my invention will be understood from the accompanying drawings and the following description and claims.

In the drawings, Figure 1 is a plan view of the upper part of a spade-handle, showing the D connected. Fig. 2 is a plan view of the D with the lower portion cut away so as to show a horizontal transverse section. Fig. 3 is a plan view of the upper part of the stem or handle ready to be inserted in the D. Fig. 4 is a section on the line 4 4 of Fig. 1. Fig. 5 is a section on the line 5 5 of Fig. 1. Fig. 6 is a plan view of the brad used in my improvement.

In the drawings, 10 is a D or spade handle, and 11 is the handle proper. The manner of forming the union between these two is explained in my former patent above referred to and is also shown in Figs. 2 and 3 herein. As therein shown, the stem or handle 11 is turned down at 12, so as to be reduced and elongated somewhat, as seen in Fig. 3, and from that two separate dowels 15 extend. The parts 11, 12, and 15 are integral. The dowels are round, preferably.

The D 10 has in its lower end sockets to receive the parts of the handle shown in Fig. 3. There is an enlarged socket 14 at the entrance, adapted to receive the large portion of the handle 10, so as to embed the end of said handle within the D and obscure the end of the handle, as well as strengthen the union. The socket farther on in the handle is divided into two diverging branches 15, as shown in Fig. 2. The union is perfected by driving one into the other, as set out in my former patent. This effects a very strong union and makes the two-piece handle inseparable; but, as stated before, the D checks both above and below the handle 10, where the D is thin, and discloses the reduced portion of the stem or handle D below and makes an unsightly connection and an unsalable article, for when the parts are in perfect condition the fact that the handle is made of two pieces is not discoverable. Therefore, in my new and improved construction I take two brads 17, made out of sheet metal and corrugated transversely, said brad being about one-half inch wide and about three-fourths of an inch long. Before the two pieces of the handle are united, but after the sockets 14 and 15 have been made in the D, I drive brads into the lower end of the D, one on each side of the socket and extending transversely of the D and about midway in the thin portion thereof, as shown in Fig. 4. Then the dowels are driven into place tightly, as heretofore, the D being clamped between the jaws of a vise during such insertion, so that the parts of the D will not be subjected to strain while effecting the union.

With a handle made in this manner, having a corrugated brad inserted on each side of the union, the D cannot check on each side of the handle or stem, as the corrugations in the brads will prevent lateral displacement of the fiber in the D at the weak point.

While I have shown this improvement in connection with a spade-handle, of course it applies to other two-piece handles; nor do I wish to be limited to a handle in which two pieces are united in the exact manner herein set forth.

What I claim as my invention, and desire to secure by Letters Patent, is—

1. A two-piece handle, an entering piece being elongated in cross-section and a receiving-piece provided with a socket in the end thereof to receive the other piece, said socket being elongated in cross-section so as to leave the side walls of the socket relatively thick, and corrugated brads driven into said receiving-piece on each side of the socket and midway between the socket and the outside with the corrugations parallel with the socket.

2. A two-piece handle wherein one piece is socketed to receive the other piece, said receiving-piece having sockets extending inward and divided and divergent, and having an outer portion elongated in cross-section so as to leave relatively thick walls, and the entering piece reduced to form a portion elongated in cross-section to fit in the elongated portion of said sockets and two dowels extending therefrom to fit in the two inwardly-extending divergent sockets of the other piece.

3. A two-piece handle in which one piece enters the other, the entering piece being reduced in diameter and elongated in cross-section and having two separate dowel extensions therefrom, and the receiving-piece being provided in one end with sockets to receive said dowels and the reduced elongated portion of said first-named piece, the outer end of the socket being enlarged to receive the end of the enlarged portion of said entering piece and obscure the same, and means extending transversely of the fiber of the receiving-piece at the union to prevent checking.

In witness whereof I have hereunto affixed my signature in the presence of the witnesses herein named.

THOMAS W. WRIGHT.

Witnesses:
JACOB A. NORRIS,
ALFRED V. ABBOTT.